United States Patent [19]

Sato

[11] 4,324,458
[45] Apr. 13, 1982

[54] TELE-OBJECTIVE LENS WITH A MOVABLE SUB-GROUP FOR FOCUSING

[75] Inventor: Yasuhisa Sato, Kanagawa, Japan

[73] Assignee: Canon Kabushiki Kaisha, Tokyo, Japan

[21] Appl. No.: 136,086

[22] Filed: Apr. 10, 1980

Related U.S. Application Data

[63] Continuation of Ser. No. 870,228, Jan. 17, 1978, abandoned.

[30] Foreign Application Priority Data

Jan. 20, 1977 [JP] Japan ............................. 52-5182

[51] Int. Cl.³ ........................... G02B 9/60; G02B 9/34
[52] U.S. Cl. ..................................... 350/454; 350/469
[58] Field of Search ........ 350/216, 220, 176, 454-456, 350/469

[56] References Cited

U.S. PATENT DOCUMENTS 4,045,128 8/1977 Momiyama ...................... 350/454

FOREIGN PATENT DOCUMENTS

1085347 7/1960 Fed. Rep. of Germany ...... 350/469

Primary Examiner—John K. Corbin
Assistant Examiner—Bruce Y. Arnold
Attorney, Agent, or Firm—Toren, McGeady & Stanger

[57] ABSTRACT

A telephoto objective lens consisting of a positive front lens group and a negative rear lens group which is divided into sub-groups, the rear one being movable for focusing and the front one remaining stationary, thereby the weight of the complete objective is minimized. As the front lens group consists of only one positive and only one negative lens element, since the provision for focusing is made at such lens, this objective lens tends to produce aberrations of which the spherical and comatic aberrations are particularly deteriorated. According to the invention, therefore, the frontmost surface and rearmost surface of the front lens group and the rearmost surfce of the movable sub-group are specified in radius of curvature to achieve good stability of correction of the aberrations throughout the focusing range.

7 Claims, 36 Drawing Figures

FIG.5A

Spherical aberration

FIG.5B

Astigmatism

FIG.5C

Distortion

FIG.5D

Lateral chromatic aberration

FIG.6A

Spherical aberration

FIG.6B

Astigmatism

FIG.6C

Distortion

FIG.6D

Lateral chromatic aberration

Spherical aberration

FIG.8B

Astigmatism

FIG.8C

Distortion

FIG.8D

Lateral chromatic aberration

FIG. 9A SPHERICAL ABERRATION

FIG. 9B ASTIGMATISM

FIG. 9C DISTORTION

FIG. 9D LATERAL CHROMATIC ABERRATION

Spherical aberration

FIG.11B

Astigmatism

FIG.11C

Distortion

FIG.11D

Lateral chromatic aberration

SPHERICAL ABERRATION

FIG. 12A

ASTIGMATISM

FIG. 12B

DISTORTION

FIG. 12C

LATERAL CHROMATIC ABERRATION

FIG. 12D

TELE-OBJECTIVE LENS WITH A MOVABLE SUB-GROUP FOR FOCUSING

This is a continuing application of application Ser. No. 870,228, filed Jan. 17, 1978 now abandoned.

BACKGROUND OF THE INVENTION

This invention relates to a tele-objective lens consisting of a front lens group having a positive refractive power and a rear lens group having a negative refractive power.

With the telephoto objective lens, it has been the general practice to move the lens as a whole to effect focusing. In U.S. Pat. No. 4,045,128, however, an inventive type of telephoto objective lens is disclosed wherein the provision for focusing is made at a subgroup thereof. The present invention is related to improvements in the objective system of the type described in U.S. Pat. No. 4,045,128.

The widely accepted design for tele-objective lens developed about 15 years ago was to construct the front lens group from only one positive and only one negative elements. Recently, the general trend is to make use of an additional positive lens element for the purpose of facilitating correction of aberrations.

Because of the relatively large dimensions of the lenses constituting the front lens group to those of lenses rearwardly subsequent thereto, however, increases in the number of lens elements lead to a rapid increase in the production cost, and to a corresponding increase in the weight of the complete objective so that it is inconvenient for a hand-held camera to employ such objective lens, as the so established camera is difficult to manage in performing photography.

SUMMARY OF THE INVENTION

An object of the present invention is to provide a tele-objective lens with the front lens group constructed from only one positive lens element and only one negative lens element, while nevertheless achieving good correction of aberrations.

Another object is to provide a tele-objective lens having a focusing provision made at a part thereof with assurance that it is made possible to maintain a high standard of aberration correction throughout the entire focusing range.

While the present invention is applicable to tele-objective lens system which are movable in whole for focusing purposes, it is described hereinafter particularly with reference to its presently preferred forms in which the rearmost lens group is made movable for focusing. It is, therefore, to be understood that the invention is not limited to the specific embodiment thereof that is illustrated in the accompanying drawing and described hereinafter, but includes all forms thereof that fall within the scope of the appended claims.

DESCRIPTION OF THE PREFERRED EMBODIMENTS

Four examples of embodiments of a tele-objective lens system according to the present invention are represented in FIGS. 1 to 4, each of which may conveniently be considered as comprising a front lens group 1 of positive power and a rear lens group of negative power axially spaced apart from each other. The rear lens group is divided into two parts or groups 2 and 3, of which the rear or third group 3 is movable for focusing purposes, while the front part or second group 2 remaining stationary. As focusing is effected from infinity down to close-ups, the third lens group 3 is moved in a rearward direction from a solid line position to a dashed line position. This constitutes one of the features of the present invention. As has been noted before, the entire system may be moved in whole with reference to the film plane to effect focusing. In this case, it is recommended that the third lens group 3 is stationary to occupy the solid line position at which the system is otherwise set for infinitely distant object.

According to the present invention, the first lens group 1 consists of two lenses, one of which is of positive power and another one which is of negative power. The second lens group 2 consists of a substantially single lens of negative power in the form of a meniscus lens rearwardly concave. This lens may be constructed from plano-convex and plano-concave lens elements to form an achromatic doublet. Though such aberrational correction is considered as unnecessary from the appropriate residual aberrations of the entire system, the employment of such doublet will be amendable to low cost production techniques. The third lens group 3 is overall of a negative refractive power and consists of two lenses one of which is of positive power and another one which is of negative power.

Figure 1:
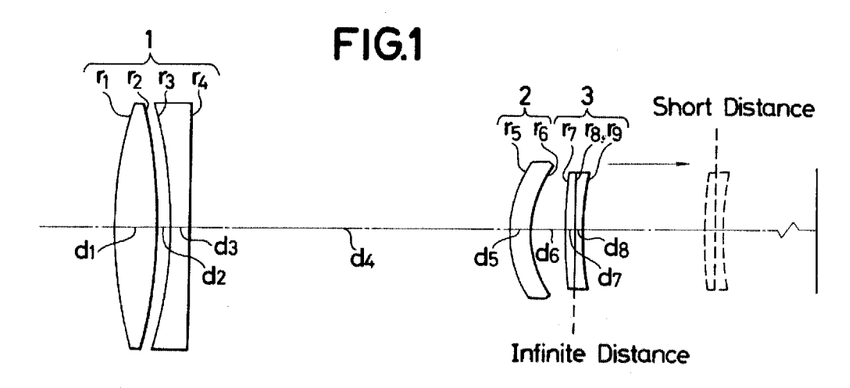
FIG. 1 is an axial sectional view of one embodiment of a tele-objective lens system according to the present invention in two different operative positions for focusing at infinity and close-up.
Figure 2:
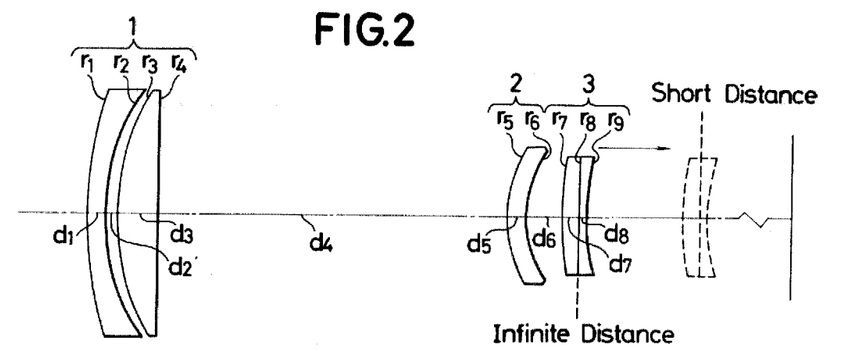
FIG. 2 is a similar view showing a second embodiment of the invention.
Figure 3:
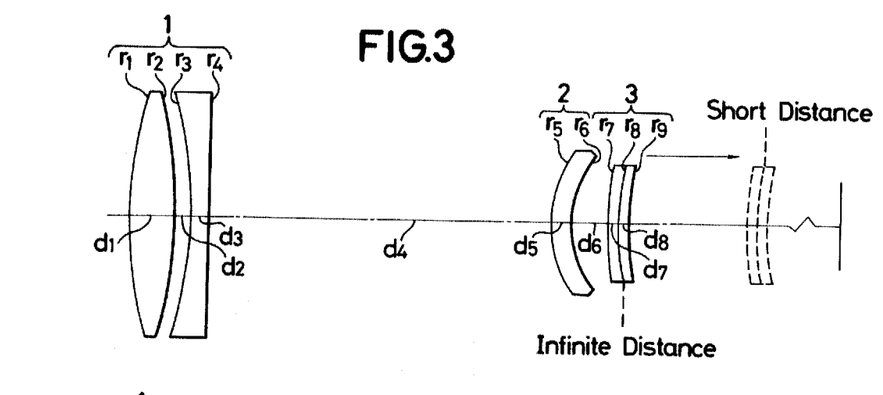
FIG. 3 is a similar view showing a third embodiment of the invention.
Figure 4:
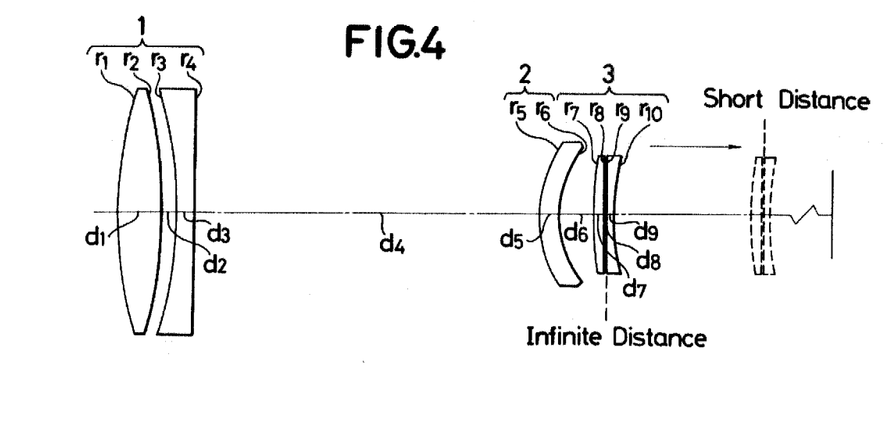
FIG. 4 is a similar view showing a fourth embodiment of the invention.
Figure 5A:
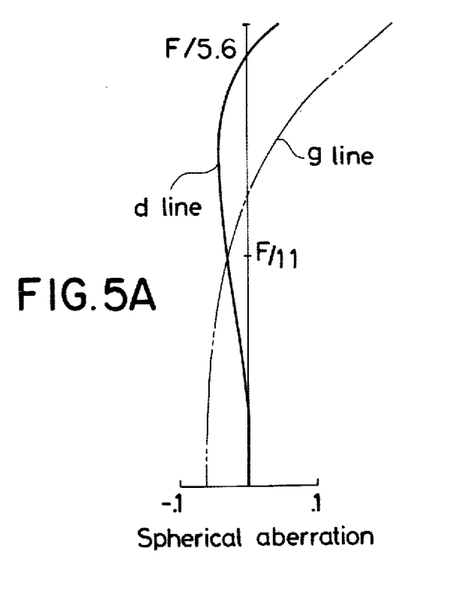
FIGS. 5A to 5D are graphic representations of spherical aberration, astigmatism, distortion and lateral chromatic aberration of Example 1 lens system respectively when set at infinity.
Figure 5B:
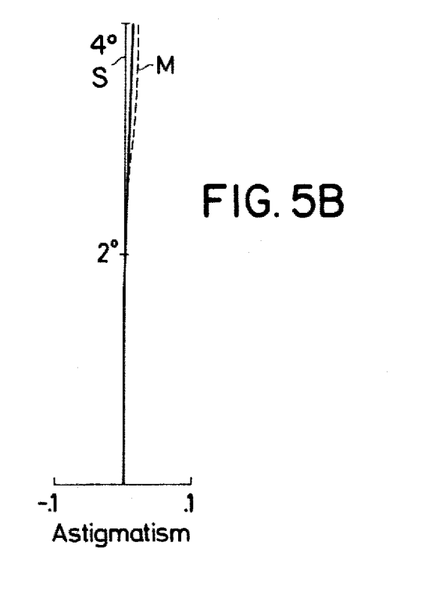
Figure 5C:
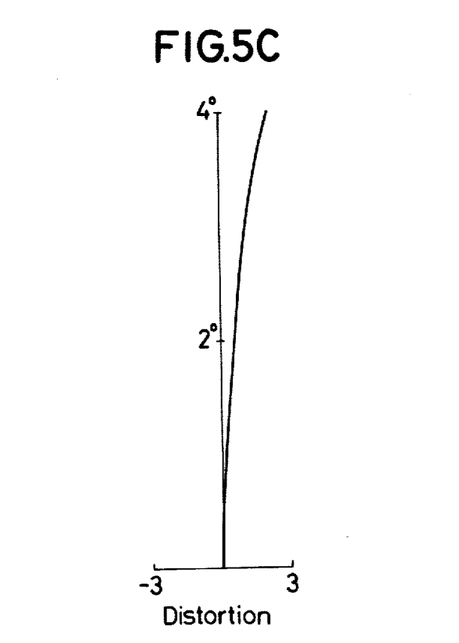
Figure 5D:
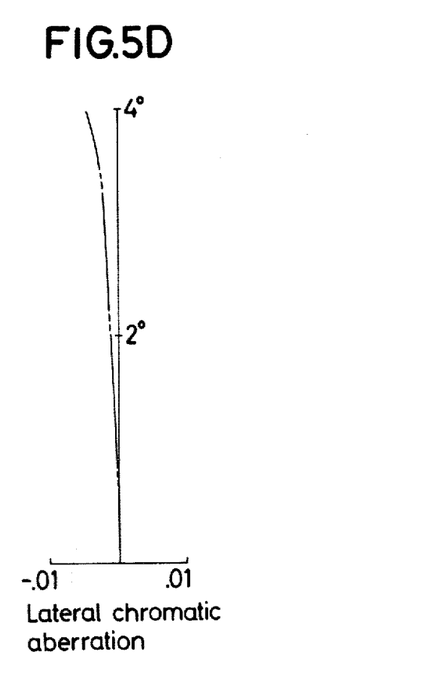
Figure 6A:
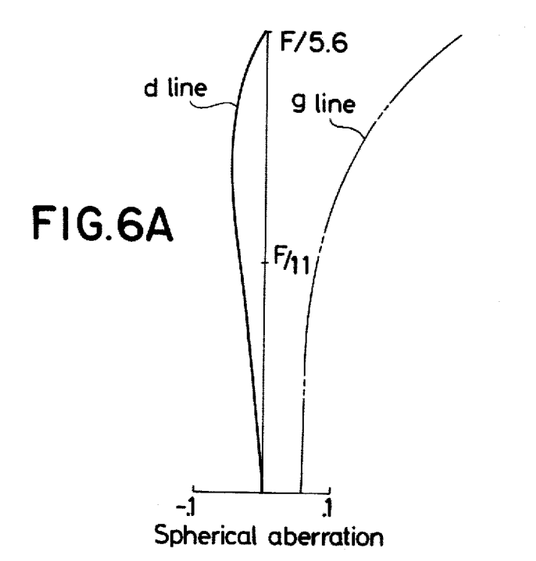
FIGS. 6A to 6D are graphic representations of the various aberrations of Example 1 lens system when set at close-up.
Figure 6B:
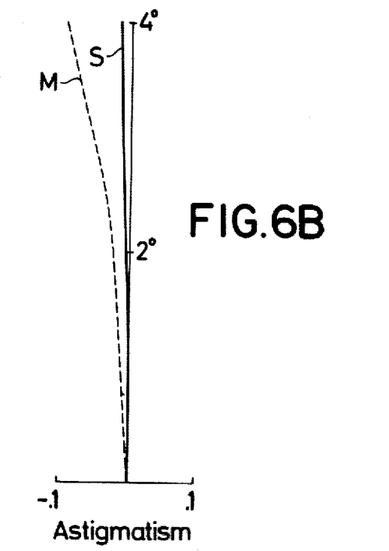
Figure 6C:
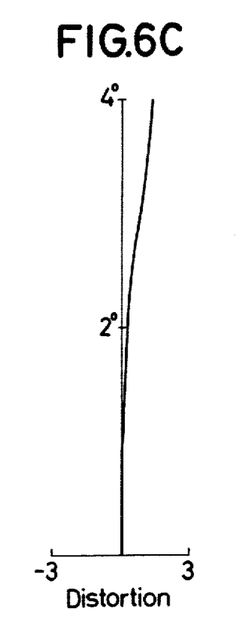
Figure 6D:
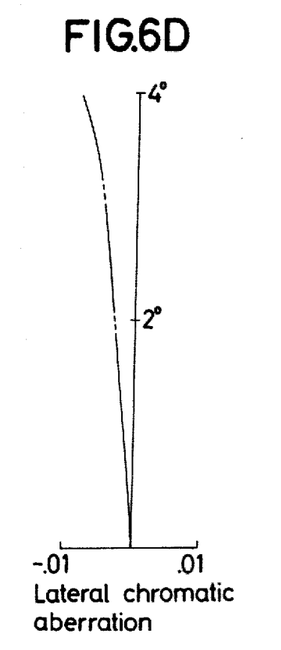
Figure 7A:
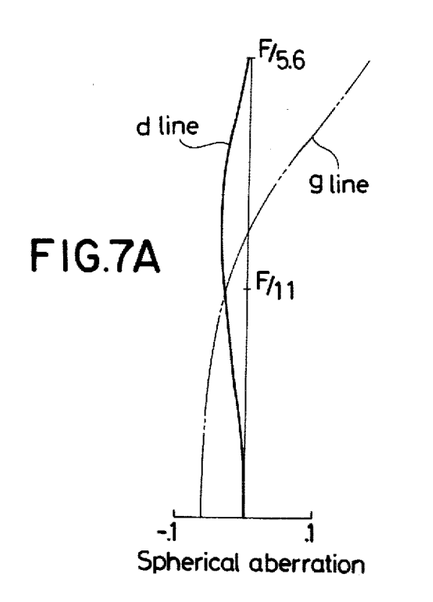
FIGS. 7A–7D and 8A–8D are similar representations of Example 2 lens system when set at infinity and close-up respectively.
Figure 7B:
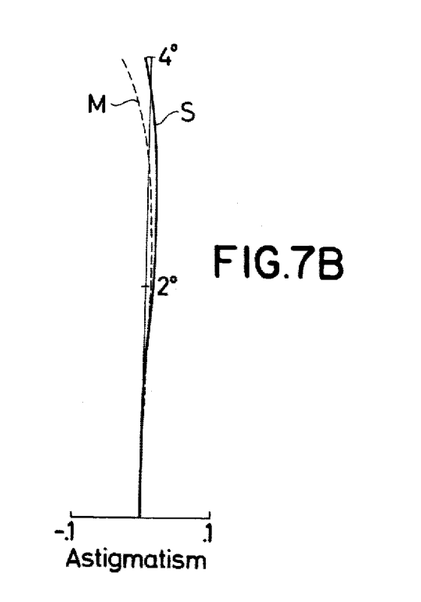
Figure 7C:
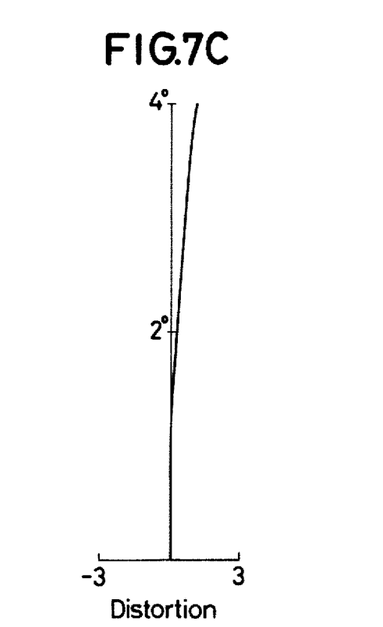
Figure 7D:
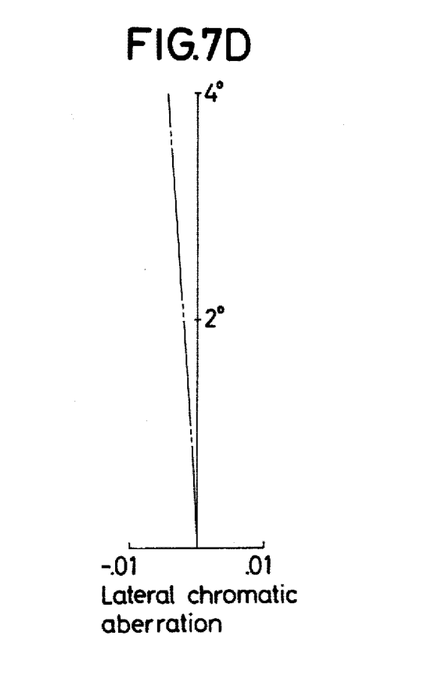
Figure 8A:
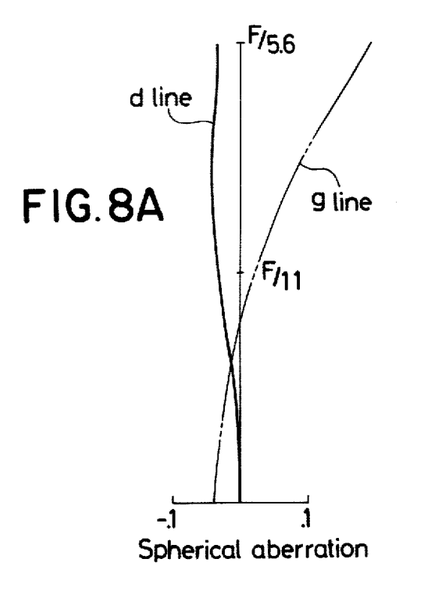
Figure 8B:
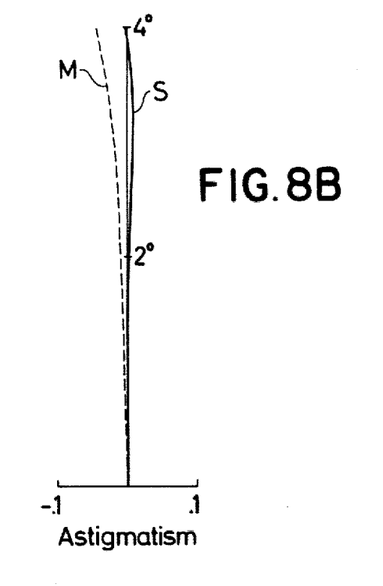
Figure 8C:
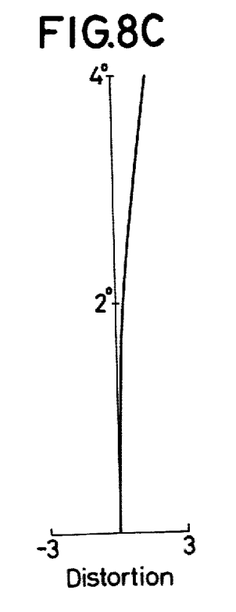
Figure 8D:
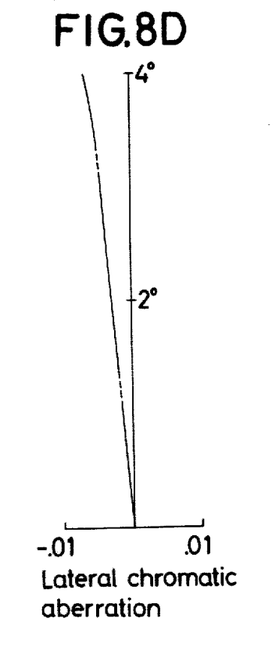
Figure 9A:
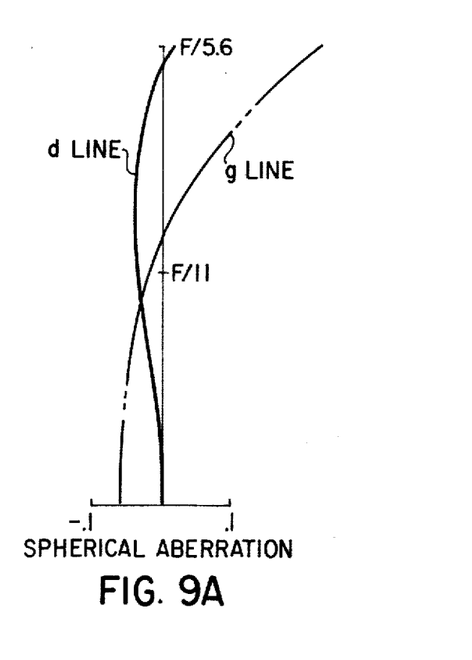
FIGS. 9A–9D and 10A–10D are similar representations of Example 3 lens system when set at infinity and close-up respectively.
Figure 9B:
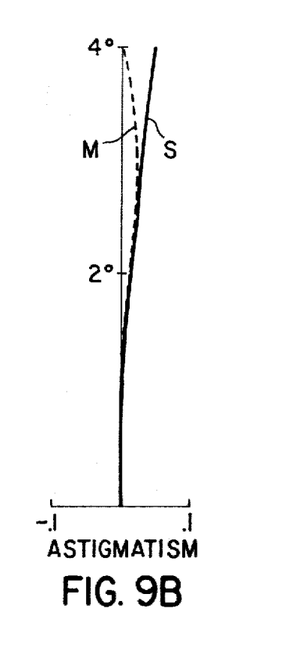
Figure 9C:
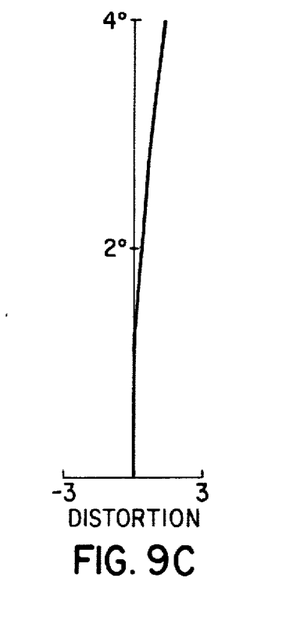
Figure 9D:
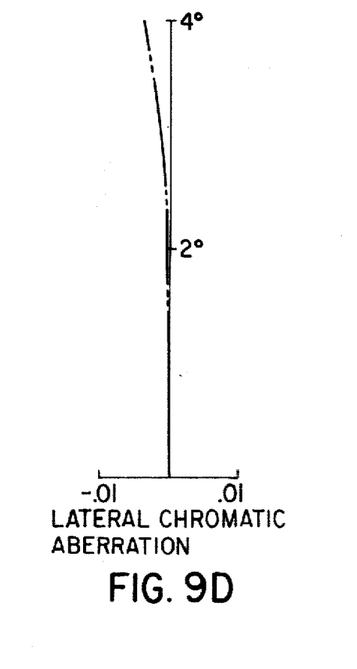
Figure 10A:
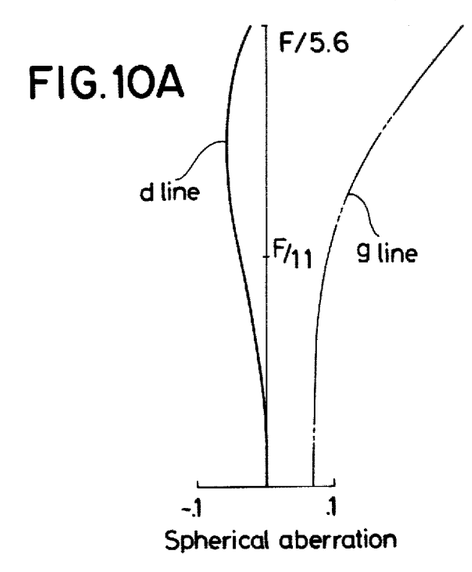
Figure 10B:
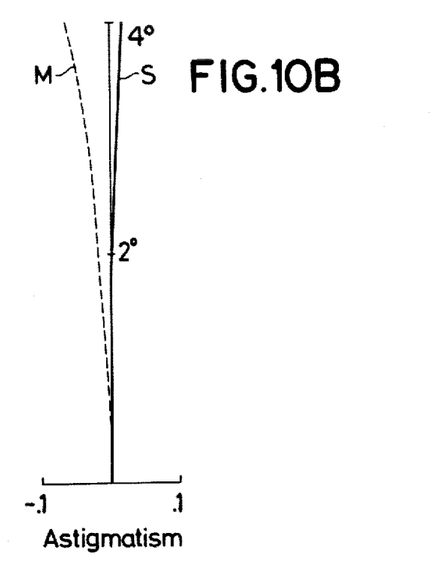
Figure 10C:
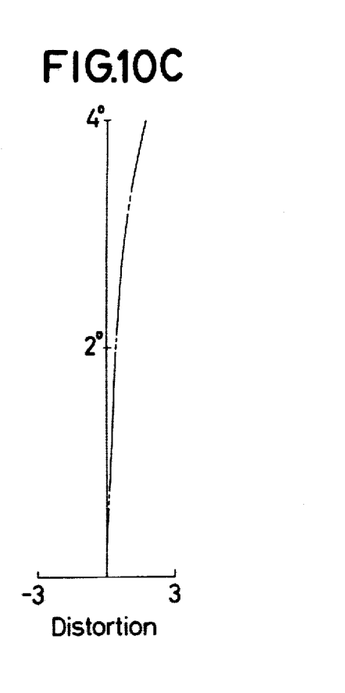
Figure 10D:
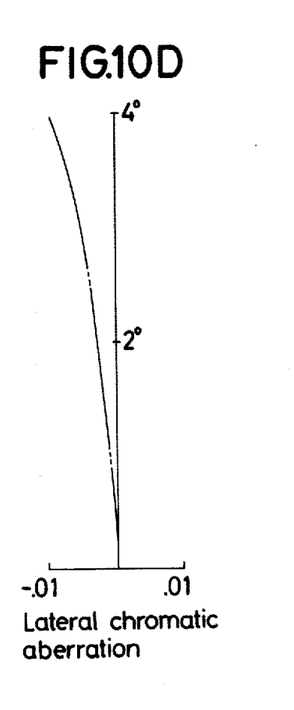
Figure 11A:
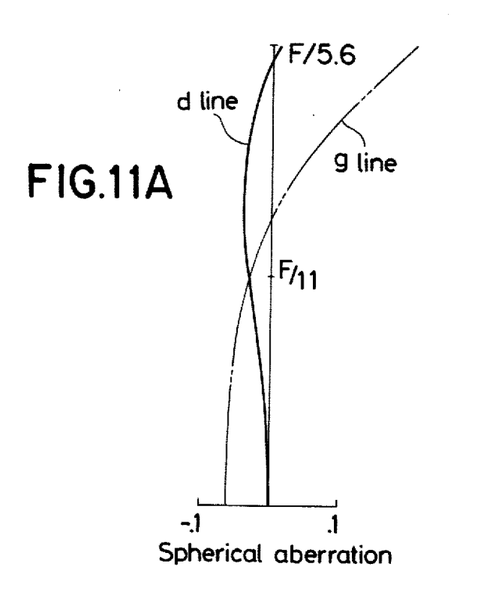
FIGS. 11A–11D and 12A–12D are similar representations of Example 4 lens system when set at infinity and close-up respectively.
Figure 11B:
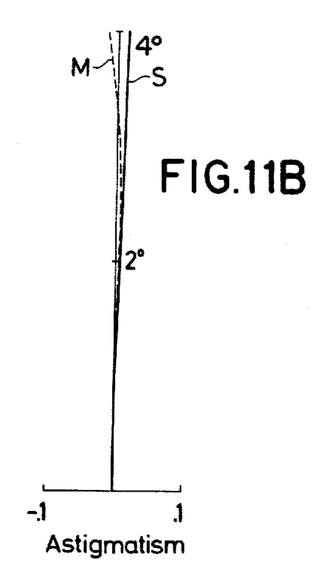
Figure 11C:
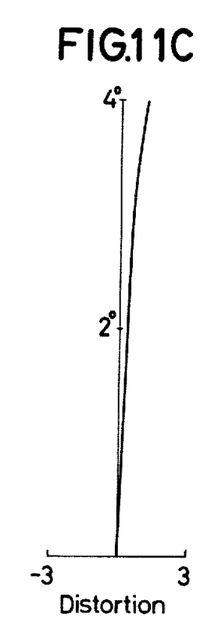
Figure 11D:
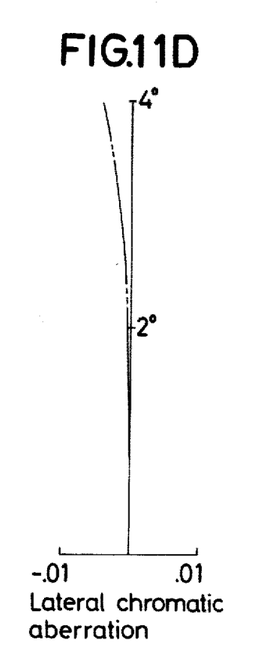
Figure 12A:
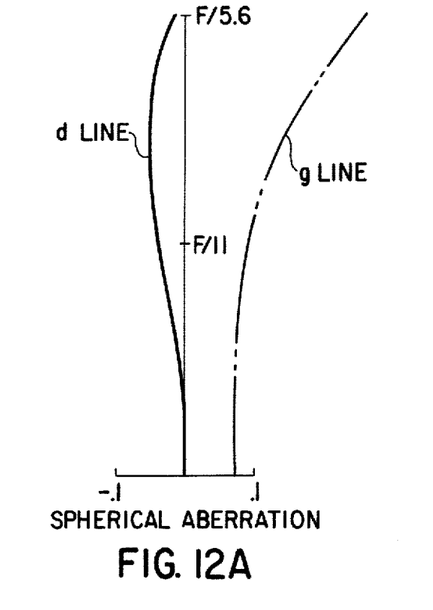
Figure 12B:
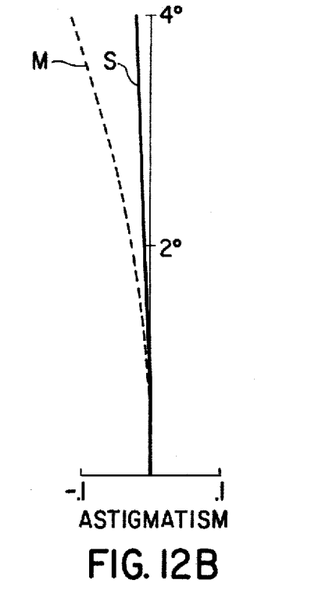
Figure 12C:
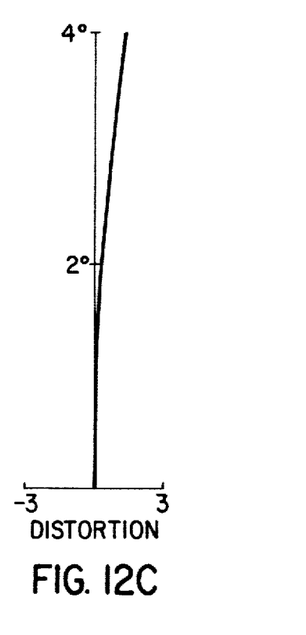
Figure 12D:
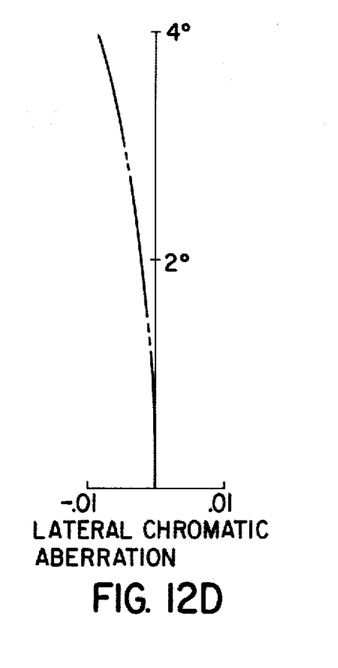

In FIGS. 1, 3 and 4, as the positive and negative lenses in the first group 1, use is made of a double convex lens and a forwardly concave lens respectively arranged in the order named from the front to create an air lens therebetween, while, in FIG. 2, such arrangement is reversed comprising a forwardly convex negative meniscus lens and a forwardly convex positive lens axially spaced from each other to create an air lens. The rearmost surface of the first group 1 is configured to a radius of curvature extremely near the infinite one. In FIGS. 1, 2 and 3, the third group 3 is constructed in the form of a doublet of the positive and negative lenses arranged in this order for the first two objectives and of the negative and positive ones arranged in this order for the last, while in FIG. 4, the positive and negative lenses are arranged in this order from the front to create an air space therebetween.

In a preferred embodiment with the above mentioned basic construction and arrangement of the lens elements, the objective of the invention fulfills at least one of the following requirements:

$$-0.01 < F/(F_{1p} \cdot V_{1p}) + F/(F_{1n} \cdot V_{1n}) < 0.01 \quad (1)$$

$$0.85 < (R'_1 + R_1)/(R'_1 - R_1) < 1.1 \quad (2)$$

$$-3.5F < F_A < -1.5F \quad (3)$$

$$0.07F < R'_2 < 0.1F \quad (4)$$

$$0.7F < |F_3| < 1.3F \quad (5)$$

$$-0.015 < F/(F_{3p} \cdot V_{3p}) + F/(F_{3n} \cdot V_{3n}) < 0.015 \quad (6)$$

$$0.15F < R'_3 < 0.35F \quad (7)$$

wherein F is the focal length of the entire system when focused for infinitely distant object; $F_1$ is the focal length of the first group; $F_{1p}$ is the focal length of the positive lens in the first group; $F_{1n}$ is the focal length of the negative lens in the first group; $V_{1p}$ is the Abbe number of the positive lens in the first group; $V_{1n}$ is the Abbe number of the negative lens in the first group; $R_1$ is the radius of curvature of the first surface ($r_1$) of the first group; $R'_1$ is the radius of curvature of the rearmost surface ($r_4$) of the first group; $F_A$ is the focal length of the air lens ($r_2$, $r_3$) in the first group; $R'_2$ is the radius of curvature of the rearmost surface ($r_6$) of the second group; $R'_3$ is the radius of curvature of the rearmost surface ($r_9$ or $r_{10}$) of the third group; $R_3$ is the focal length of the third group; $F_{3p}$ is the focal length of the positive lens in the third group; $F_{3n}$ is the focal length of the negative lens in the third group; $V_{3p}$ is the Abbe number of the positive lens in the third group; and $V_{3n}$ is the Abbe number of the negative lens in the third group.

Whilst the tele-objective lens adapted to be bodily movable for focusing enables the residual aberrations generally to be maintained substantially stable through the entire focusing range, that type of tele-objective lens which makes the focusing provision at a part thereof gives rise to the high possibility of producing a great variation of aberrations and particularly spherical aberration ascribable to the fosusing member itself, as focusing is performed, thereby the balance in aberration correction of the entire system is lost so that high grade imaging performance can not be preserved throughout the entire focusing range.

In order to eliminate such variation of the various aberrations with focusing, the following two prerequisites must be satisfied simultaneously.

(1) The spherical aberration and coma of the focusing lens group are made minimized in terms of aberration coefficients, and the proper balance between the both aberration coefficients is established, and (2) the entire system is well corrected for the various aberrations.

In this connection, it should further be explained that, in a two-group tele-objective lens system made movable in whole for focusing, the spherical aberration of the front group tends to be under-corrected, and, therefore, is required to be balanced out by the suitable design of the rear group to achieve a high standard of aberration correction through the entire system. If accommodation for change of object position is provided by imparting an independent movement to the rear group of the objective lens, the residual spherical aberration will be varied to a correspondingly large extent, as the height of incidence of image forming rays of light at the rear group is changed.

According to the formulated features of the invention, the second lens group is designed under condition (4) to provide an appropriate amount of aberration which contributes to the high standard of aberration correction of the entire system, while permitting the spherical aberration and coma of the focusing or third group to be limited to minimum and to be balanced out with each other. The design features of the first group are set forth at (1), (2) and (3), and those of the third group at (5), (6) and (7) each of which will be explained below.

Conditions (1) and (6) gives assistance in the stabilization of longitudinal chromatic aberration throughout the focusing range. As the objective of the invention is adapted to operate with a semi-angular field of view not exceeding 4 degrees, when these conditions are established, it is possible to limit the lateral chromatic aberration also to an acceptable level.

Conditions (2) and (3) are concerned with the configuration of the first group which constitutes the most important ones of the design features of the entire system particularly when the system is question is of the type described, and which affects the state of aberration connection of the entire system to a large proportion. What is generally called "shape factor" in the art of single lenses corresponds to condition (2). When any one of the upper and lower limits of this condition is exceeded, under-corrected spherical aberration will be resulted. Condition (3) determines a value of refractive power of the air lens defined by the positive and negative lenses. This air lens affects spherical aberration, comatic aberration, field of curvature and others. With regard to the spherical aberration, when the upper limit is exceeded, it will be over-corrected, while when the lower limit is exceeded, it will become under-corrected or increated in the ring band form.

Condition (4) inparts to the second group, or the negative meniscus lens that amounts of spherical aberration and coma which are over-corrected as seen in itself. This is so set forth by taking into account the fact that, if the third group movable for focusing is designed under condition (7) to have the rearmost surface of rearward concavity with limitation of spherical aberration and coma to minimum, the complete system with such third group produces under-corrected spherical aberration and coma.

Condition (5) controls the range of movement of the third group for focusing adjustments. When the upper limit is exceeded, the range of movement is so largely extended that mechanical interference due to the practical photographic lens structure can not be avoided. When the lower limit is violated, it is made difficult to correct the aberrations to satisfactory level.

Condition (7) is, as mentioned above, concerned with the configuration of the third group. When the upper limit is violated, the spherical aberration becomes under-corrected as the object distance is decreased. When the lower limit is violated, the spherical aberration becomes over-corrected with decrease in the object distance.

Four specific examples of preferred embodiments of the tele-objective lens system of the invention may be constructed in accordance with the numerical data given below for the radii of curvature, r, the lens thicknesses and axial separations, d, along with the corresponding indices of refraction, nd, for the spectral D line of sodium and the Abbe numbers for the various lens elements. The minus values of the radii, r, indicate surfaces concave toward the front. The variable separation, $d_6$, with focusing is taken at the value shown when the objective is set forth infinitely distant object.

Example 1:

| | F = 100.0 | FNo. 1:5.6 | $2\omega = 8°$ | |
|---|---|---|---|---|
| | r | d | nd | vd |
| 1 | 33.5058 | 2.949 | 1.58913 | 61.1 |
| 2 | 36.2942 | 1.912 | | |
| 3 | 33.4085 | 1.424 | 1.6727 | 32.1 |
| 4 | −671.5298 | 23.725 | | |
| 5 | 8.9708 | 1.356 | 1.58913 | 61.1 |
| 6 | 8.1227 | 2.749 | | |
| 7 | 41.4383 | 0.712 | 1.69895 | 30.1 |
| 8 | 1156.5338 | 0.542 | 1.713 | 53.9 |
| 9 | 25.6539 | | | |

Example 2:

| | F = 100.0 | FNo. 1:5.6 | $2\omega = 8°$ | |
|---|---|---|---|---|
| | r | d | nd | vd |
| 1 | 30.1688 | 1.424 | 1.69895 | 30.1 |
| 2 | 17.7817 | 0.946 | | |
| 3 | 18.4847 | 2.902 | 1.58913 | 61.1 |
| 4 | 6059.6105 | 25.502 | | |
| 5 | 10.4502 | 1.356 | 1.58913 | 61.1 |
| 6 | 9.3380 | 2.729 | | |
| 7 | 31.6054 | 1.210 | 1.69895 | 30.1 |
| 8 | 110.6620 | 0.542 | 1.713 | 53.9 |
| 9 | 19.9742 | | | |

Example 3:

| | F = 100.0 | FNo. 1:5.6 | $2\omega = 8°$ | |
|---|---|---|---|---|
| | r | d | nd | vd |
| 1 | 32.8478 | 3.214 | 1.58913 | 61.1 |
| 2 | 35.5624 | 1.075 | | |
| 3 | 32.2451 | 1.424 | 1.6727 | 32.1 |
| 4 | 622.9698 | 25.403 | | |
| 5 | 9.5414 | 1.356 | 1.58913 | 61.1 |
| 6 | 8.6190 | 2.749 | | |
| 7 | 32.9044 | 0.542 | 1.713 | 53.9 |
| 8 | 15.3051 | 0.685 | 1.80518 | 25.4 |
| 9 | 17.9393 | | | |

Example 4:

| | F = 100.0 | FNo. 1:5.6 | $2\omega = 8°$ | |
|---|---|---|---|---|
| | r | d | nd | vd |
| 1 | 33.7136 | 3.108 | 1.58913 | 61.1 |
| 2 | 37.1715 | 1.054 | | |
| 3 | 33.8288 | 1.424 | 1.6727 | 32.1 |
| 4 | −773.2559 | 1.675 | | |
| 5 | 9.5251 | 1.356 | 1.58913 | 61.1 |
| 6 | 8.6254 | 2.749 | | |
| 7 | 34.5403 | 0.695 | 1.69893 | 25.4 |
| 8 | 179.4034 | 0.088 | | |
| 9 | 176.2224 | 0.542 | 1.713 | 53.9 |
| 10 | 22.7308 | | | |

The calculated values of the formulae (1) to (7) for Examples 1 to 4 are compiled in the table below.

| (1) | 0.0047 | 0.0011 | 0.0061 | −0.0055 |
|---|---|---|---|---|
| (2) | 0.905 | 0.990 | 0.900 | 0.916 |
| (3) | 3.05F | 1.60F | 2.55F | 2.70F |
| (4) | 0.0918F | 0.0934F | 0.0862F | 0.0863F |
| (5) | 1.034F | 0.794F | 0.831F | 0.954F |
| (6) | 0.0047 | 0.0009 | 0.0057 | 0.0138 |
| (7) | 0.274F | 0.1997F | 0.199F | 0.227F |

What is claimed is:

1. A tele-objective lens, with a movable sub-group for focusing, comprising:

a positive lens group, consisting of one positive lens and one negative lens spaced from each other, and the curvature of the frontmost lens surface thereof being stronger than that of the rearmost lens surface, and a negative lens group, being located axially in the image side of said positive lens group and consisting of a stationary meniscus lens and a movable sub-group for focusing;

said stationary meniscus lens facing with its concave surface toward said movable sub-group, and said movable sub-group including positive and negative lenses; and wherein, when the focal length of the whole system is F and the focal length of said movable sub-group is $F_3$, said tele-objective lens satisfies the condition of $0.7F < |F_3| < 1.3F$.

2. A tele-objective lens according to claim 1, wherein said positive lens group consists of a double convex lens and a forwardly concave negative lens arranged in this order from the front.

3. A tele-objective lens according to claim 1, wherein said positive lens group consists of a forwardly convex negative meniscus lens and a forwardly convex positive lens arranged in this order from the front.

4. The tele-objective lens of claim 1, wherein the lens elements have the following values:

| | F = 100.0 | FNo. 1:5.6 | $2\omega = 8°$ | |
|---|---|---|---|---|
| | r | d | nd | vd |
| 1 | 33.5058 | 2.949 | 1.58913 | 61.1 |
| 2 | −36.2942 | 1.912 | | |
| 3 | −33.4085 | 1.424 | 1.6727 | 32.1 |
| 4 | −671.5298 | 23.725 | | |
| 5 | 8.9708 | 1.356 | 1.58913 | 61.1 |
| 6 | 8.1227 | 2.749 | | |
| 7 | 41.4383 | 0.712 | 1.69895 | 30.1 |
| 8 | 1156.5338 | 0.542 | 1.713 | 53.9 |
| 9 | 25.6539 | | | | and wherein F is a focal length, $2\omega$ is a view angle, r is a radius of the lens surface, d is an axial length or air gap of a lens, nd represents the refractive index of the lens medium and vd represents Abbe number of the lens medium.

5. The tele-objective lens of claim 1, wherein the lens elements have the following values:

| | F = 100.0 | FNo. 1:5.6 | $2\omega = 8°$ | |
|---|---|---|---|---|
| | r | d | nd | vd |
| 1 | 30.1688 | 1.424 | 1.69895 | 30.1 |
| 2 | 17.7817 | 0.946 | | |
| 3 | 18.4847 | 2.902 | 1.58913 | 61.1 |
| 4 | −6059.6105 | 25.502 | | |
| 5 | 10.4502 | 1.356 | 1.58913 | 61.1 |
| 6 | 9.3380 | 2.729 | | |
| 7 | 31.6054 | 1.210 | 1.69895 | 30.1 |
| 8 | 110.6620 | 0.542 | 1.713 | 53.9 |
| 9 | 19.9742 | | | | and wherein F is a focal length, $2\omega$ is a view angle, r is a radius of the lens surface, d is an axial length or air gap of a lens, nd represents the refractive index of the lens medium and vd represents Abbe number of the lens medium.

6. The tele-objective lens of claim 1, wherein the lens elements have the following values:

| | F = 100.0 | FNo. 1:5.6 | 2ω = 8° | |
|---|---|---|---|---|
| | r | d | nd | vd |
| 1 | 32.8478 | 3.214 | 1.58913 | 61.1 |
| 2 | −35.5624 | 1.075 | | |
| 3 | −32.2451 | 1.424 | 1.6727 | 32.1 |
| 4 | −622.9698 | 25.403 | | |
| 5 | 9.5414 | 1.356 | 1.58913 | 61.1 |
| 6 | 8.6190 | 2.749 | | |
| 7 | 32.9044 | 0.542 | 1.713 | 53.9 |
| 8 | 15.3051 | 0.685 | 1.80518 | 25.4 |
| 9 | 17.9393 | | | | and wherein F is a focal length, 2ω is a view angle, r is a radius of the lens surface, d is an axial length or air gap of a lens, nd represents the refractive index of the lens medium and vd represents Abbe number of the lens medium.

7. The tele-objective lens of claim 1, wherein the lens elements have the following values:

| | F = 100.0 | FNo. 1:5.6 | 2ω = 8° | |
|---|---|---|---|---|
| | r | d | nd | vd |
| 1 | 33.7136 | 3.108 | 1.58913 | 61.1 |
| 2 | −37.1715 | 1.054 | | |
| 3 | −33.8288 | 1.424 | 1.6727 | 32.1 |
| 4 | −773.2559 | 1.675 | | |
| 5 | 9.5251 | 1.356 | 1.58913 | 61.1 |
| 6 | 8.6254 | 2.749 | | |
| 7 | 34.5403 | 0.695 | 1.69893 | 25.4 |
| 8 | 179.4034 | 0.088 | | |
| 9 | 176.2224 | 0.542 | 1.713 | 53.9 |
| 10 | 22.7308 | | | | and wherein F is a focal length, 2ω is a view angle, r is a radius of the lens surface, d is an axial length or air gap of a lens, nd represents the refractive index of the lens medium and vd represents Abbe number of the lens medium.

* * * * *